Dec. 19, 1961    L. J. MacKINNON ETAL    3,014,189
ELECTRICAL REACTOR WITH MAGNETIC SHIELDING
Filed Dec. 24, 1957

Inventors,
Lloyd J. MacKinnon,
Anthony B. Trench,
by Gilbert P. Tarleton
Their Attorney.

United States Patent Office 3,014,189
Patented Dec. 19, 1961

3,014,189
ELECTRICAL REACTOR WITH MAGNETIC SHIELDING
Lloyd Joseph MacKinnon, Guelph, Ontario, and Anthony B. Trench, Kitchener, Ontario, Canada, assignors to Canadian General Electric Company Limited, Toronto, Ontario, Canada, a corporation of Canada
Filed Dec. 24, 1957, Ser. No. 704,981
Claims priority, application Canada Dec. 28, 1956
1 Claim. (Cl. 336—87)

This invention relates to electrical reactors and more particularly to shell type reactors such as used for the protection and control of electrical power systems and apparatus.

Although having the wide range of application mentioned above, the shell reactor of this invention is considered particularly suitable for use as a filter reactor for removing any "ripple" generated in the power pack of equipment such as radar transmitters.

As is well known in the electrical art, reactors are essentially inductive coils which may be serially inserted in a circuit in order to present an adequate impedance to excessive current flowing therein, without, however, causing any appreciable wastage of power under normal current conditions. It is possible to utilize reactors for such current-limiting purposes because of their inductive properties, which cause them to choke, block off, or filter out any current fluctuations which may attempt to pass through them, whether in the form of a "surge" or a "ripple." When used for protection of circuit breakers, reactors are also effective to reduce the breaker cost, since they reduce the fault-current-interrupting rating required of the breaker. The reactors used for protecting and controlling electrical power transmission and distribution systems and their associated apparatus (e.g. transformers, generators, and circuit breakers are known as heavy-current or power reactors and are generally of either core type construction or shell type construction, both of which constructions are well known in the art and require no further explanation.

Electrical reactors are usually designed for operation in either a three-phase or a single-phase system and several factors must be taken into consideration in the design of such reactors depending upon the intended systems of operation. For instance, mutually additive electromagnetic intercoupling between turns of the same phase is desirable since it increases the fault current limiting inductive effect without recourse to additional turns. Mutual intercoupling between phases is usually undesirable, however, as it increases line voltage drop under normal current conditions without providing correspondingly increased protection since the occurrence of a fault on any one line is liable to unbalance the lines and thereby alter the effective reactance coupled to the faulty line thus presenting an uncertain value of impedance to the fault current. Where a certain amount of such interphase coupling is unavoidable, it should at least be symmetrical in order that the lines do not become unbalanced during normal operation. A reactor must also have a low power consumption under normal current conditions since any power loss appears as heat in the windings, etc. and is thus effective to raise the operating temperature of the reactor, besides lowering the efficiency of the associated circuit. Of the losses occurring in reactors, the most elusive are those attributable to eddy currents which arise due to the presence of an alternating flux and consist of stray currents circulating (i.e. "eddying") in random paths or "loops" in the electrically conductive material of the electric and magnetic circuits comprising the reactor. A further objective in designing a reactor is to limit the amount of flux straying from the vicinity of the reactor. Such stray flux is sometimes referred to as the "leakage flux" and may induce eddy currents in adjacent sheet metal structures such as switchgear cubicles, thereby giving rise to objectionable "hot-spots" and associated losses. In addition, such leakage flux may cause interference with nearby electronic equipment etc.

From a structural viewpoint, it is desirable that a reactor be mechanically robust, since when carrying current an electrical coil experiences electromagnetic forces tending to expand it in its radial direction. Compactness is desirable since it enables versatility of installation, and there should be few different component parts in order to simplify manufacture, assembly and servicing. Of the reactors presently employed, three-phase reactors have often been built up from three single-phase reactors, each consisting essentially of a cylindrical coil helically wound in layers on an air-core or former. These cylindrical reactors have been variously positioned with respect to one another such as by stacking in coaxial juxtaposed relationship, by arranging in tandem, or by placing in laterally adjacent relationship such that they occupy the vertices of an equilateral triangle. Alternatively three-phase reactors have been initially designed as such, consisting essentially of three single-phase coils having a common air-core and employing the above configurations with varying degrees of success. Hitherto reactors have been reinforced as by embedding the coils in concrete which, of course, adds considerably to the weight. Eddy current losses are proportional to the respective squares of the frequency of the alternating flux and the peak density thereof, and to the cube of the minimum dimension, i.e. width, of any electrically conductive area disposed perpendicularly thereto. The only practical method of reducing eddy currents is therefore to laminate such areas into a plurality of thin strips, each having a minimum dimension, or width, sufficiently narrow to cause its associated eddy-current path or loop to become flattened or elongated to such an extent that one side of the loop is brought into substantial coincidence with the other side of the loop to effect substantial cancellation of the eddy current circulating therein. It has proved a relatively simple matter to thus divide the magnetic circuit into a plurality of laminations having their narrow edges disposed in the requisite manner toward the flux and, provided the turns of conductor forming the electric circuit are of sufficiently small gauge, they also present only a small width of area disposed perpendicularly to any flux linking the coil, irrespective of the local direction of said flux.

It has long been realized that it would be economically preferable to form the electrical windings from a single relatively broad ribbon of conductive material which could be readily wound in a spiral or watchspring configuration, whereby successive concentric layers of radially progressing turns of ribbon would replace the successive coaxial layers of axially progressing turns of wire presently used in forming electrical reactance coils. Otherwise stated, each layer of axially stacked turns of wire in a conventionally wound coil would in effect be replaced by approximately the same number of radially stacked turns of ribbon in the proposed spirally wound coil, the cross-sectional area of the ribbon being approximately the same as that of the wire it replaces. The above eddy current considerations have hitherto precluded effective utilization of the ribbon wound coil construction, however, since any magnetic field existing in the vicinity of a conventionally constructed coil is never completely unidirectional whereby any such ribbon aligned edgewise to the axial component of flux in the manner contemplated would also be disposed broadside to the radial component and vice versa.

An allied disadvantage of contemporary reactors is that they generally have no inherent electromagnetic shielding qualities so that some shielding means must be employed when their use in conjunction with interference-susceptible equipment is contemplated. Such shielding as exists is often inadvertently provided by the sheet metal panelling enclosing the reactor or associated electrical equipment and is thus seldom adequate or predictable. Such sheet metal enclosures, by thus attracting the flux, assume a large proportion of the hysteresis and eddy current losses of the reactor and may thus become unpleasantly or even dangerously hot in addition to causing unnecessary wastage of power. Eddy current shielding means are therefore required in addition to interference shielding and prior attempts to protect such cubicles against unnecessary heating etc. have led to provision of masses of magnetic material to shunt such leakage flux away from the vicinity of the cubicle walls. Such eddy-current shielding masses generally take the form of bundles of laminations disposed longitudinally between the reactor and cubicle to attract most of the stray flux and thus assume a proportion of the total hysteresis and eddy current losses. Sometimes the shielding masses may comprise end bells which can be designed to act as shorted turns to assist in flux reduction in addition to absorbing stray flux in the manner just described. Such prior devices have generally been clumsy, expensive and difficult to manufacture and assemble and do not constitute any part of the reactor per se. Although fairly effective in shielding portions of the enclosing cubicle (e.g., the top and bottom in the case of end bells), there is, nevertheless, a considerable leakage of flux to the remainder of the cubicle which acts as a return path for the flux unless the reactor cubicle distance is kept large with a resulting lack of compactness. Furthermore, the flux concentration caused in the vicinity of the magnetic end bells, etc. manifests itself as fringing to adjacent portions of the cubicle walls whereby the diffuse flux leakage inherent in unshielded reactors is in effect replaced by local flux concentrations which tend to give rise to local hot-spots in place of the more uniform heating occurring in unshielded cubicles.

A further disadvantage of present heavy-current reactors arises from the lack of effective means for adjusting the value of their inductance over any appreciable range after shipment from the manufacturer's plant. Attempts to overcome such inflexibility in design have led to variable core, etc., reactors which generally provide screw means for shifting the position of the magnetic circuit with respect to the associated electric circuit or coil. Such schemes, however, introduce added complexity and expense to the reactor on account of the moving parts forming said shifting mechanism.

It will be evident from the foregoing observations that presently employed reactors, particularly those used for power control purposes, embody a number of undesirable features in their design whereby they are not susceptible to rapid and economical production nor to ready readjustment of their design parameters thereafter.

Accordingly, it is a primary object of this invention to provide an economical reactor construction the inductance of which is readily adjustable over a substantial range of values.

It is a further object of the invention to provide a reactor construction which will enable effective utilization of coils employing the spirally-wound ribbon principle.

It is also an object of the invention to provide a reactor having intrinsic eddy-current shielding and applicability to a wide range of heavy-current power-control circuits.

It is particularly an object of the invention to provide a self-shielding filter reactor suitable for interference-free use in the power pack of a radar transmitter or like equipment.

Briefly the invention resides in providing a ribbon wound spiral coil to serve as the electrical circuit of a reactor. In order to prevent occurrence of eddy currents in the relatively wide conductive ribbon, it is necessary as explained above to ensure that the flux within the coil is all oriented unidirectionally into parallel alignment with the ribbon surface. This is achieved in the instant invention by placing members of ferromagnetic material, such as iron, at both faces of the coil whereby all flux linking the coil turns tends to pass directly from face-to-face of the coil and is thereby constrained to pass through the coiled ribbon in an edgewise manner only. By thus constraining substantially all flux linking the coil to permeate the coil turns in parallel alignment with coil central axis, the radial component of flux is practically eliminated throughout the coil, whereby all flux linking the coil passes through the ribbon in the edge-to-edge direction only. The ribbon edge is thus made to serve as a lamination sufficiently narrow to inhibit the formation of any appreciable eddy current loss. The aforementioned pair of flux-aligning magnetic members are joined together exteriorly of the coil by means of a similar pair of flux-guiding members, which thus provide a return magnetic path to ensure that the flux exteriorly of the coil is also parallel to the broad surfaces of the conductive ribbon. The completed flux-contouring magnetic circuit thus encases the ribbon wound coil to provide adequate electromagnetic shielding thereof in respect of both eddy currents and interference. The inductance of the resulting shell type reactor may be readily adjusted over a substantial range of values by inserting (preferably at the joints between the respective flux-aligning and guiding members) an appropriate amount of non-magnetic material to vary the air-gap of the magnetic circuit to the required extent.

While the specification concludes with claims particularly pointing out and distinctly claiming the subject matter which we regard as our invention, it is believed that the invention will be better understood from the following description taken in connection with the accompanying drawing.

Although the invention will be described with reference to a D.C. filter reactor, it is to be understood to have a wide range of application including motor starting reactors, load ratio control reactors, shunt reactors and impedance balancing reactors.

Figures 1, 2, 3:
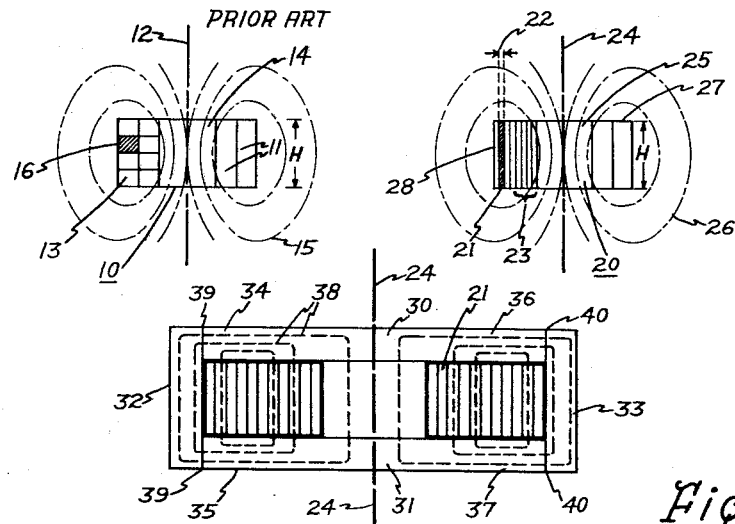
FIG. 1 is a cross-sectional schematic view of a coil built up from layers of axially wound wire-type conductor in the conventional manner of the prior art.
FIG. 2 is a cross-sectional schematic view of a relatively broad ribbon-type conductor spirally wound to form an economically desirable coil construction whose efficient utilization is made feasible by virtue of the instant invention.
FIG. 3 is a cross-sectional schematic view of a reactor and showing how use of the ribbon wound coil of FIG. 2 is made feasible by resorting to the magnetic circuit construction of the present invention.

Referring now to the drawings, there appears in FIG. 1 a schematic cross-section of a conventional reactor coil 10 comprising a succession of serially connected winding layers 11 arranged concentrically about a common central axis 12. Each of concentric layers 11 is formed from a series of axially stacked turns 13 of wire-type conductor. The coil 10 is normally wound on an arbor which may be an insulative cylinder arranged to provide a central bore or air-core 14.

The conductor turns 13 are normally of circular cross-section although they may of course be of any convenient cross-sectional configuration, a square section having been shown for simplicity. Likewise only a pair of concentric layers 11 have been illustrated, although a larger number of radially stacked layers of turns is generally employed. The flux field generated when current is flowing in the coil turns 13 assumes approximately the familiar configuration 15 as shown.

It should be readily possible to form a coil having the same overall dimensions as coil 10 by effecting a geometrical redistribution of the elementary areas 16 which represent the respective cross-sectional areas of the individual turns 1. Such a rearranged coil is schematically shown in cross-section at 20 in FIG. 2 wherein each of the turns 13 formerly represented by an area 16 of FIG. 1 has been reconstituted as an equal ribbon area 21 of a breadth "h" equal to the axial height of the former layer 11 and a proportionally reduced edge width 22. It follows that each layer 11 of axially stacked wire turns shown in coil 10 may in effect be replaced in the reconstituted coil 20 by an equivalent layer 23 containing the same number of radially stacked ribbon turns. Coil 10 can thus be reconstituted as a spirally wound coil 20 employing ribbon type conductor but otherwise similar to coil 10 in respect of central axis 24 and bore 25. As would be expected, such similarity also results in substantially the same magnetic field pattern 26. Since the layers 11 and 23 have the same cross-sectional areas and number of turns, and are furthermore disposed in approximately the same positions relative to the remainder of their respective coils, it may be assumed that their current and inductive ratings are also approximately equal. It will be apparent that when the ribbon is wound to form the reconstituted coil 20 the two continuous narrow edges 22 are effective to form respectively the two plane surfaces 27 which comprise the resulting pair of coil faces. The foregoing considerations lead to the conclusion that any conventional wire wound coil employing axially stacked turns can be replaced by an electrically equivalent ribbon-wound coil of substantially the same physical size and employing only radially spiralling turns. It is to be understood that the term "spirally wound" as used herein is intended to connote essentially radially-progressing turns and such need not necessarily be restricted solely to a circular configuration, but may, if desired, be of square, or hexagonal, or other suitable configurations. The ribbon wound spiral construction of the reconstituted coil 20 enables close additive intercoupling between the component turns and is inherently more economical as there is no need during manufacture to employ axial traverse of the conductor "pay-out" head relative to the arbor, nor is any interturn space wasted in the finished coil as is the case when the conductor cross-section 16 is circular in the customary fashion. It will be noted that the turns of conventional coil 10 always present a relatively narrow dimension (the wire diameter in the case of the normal circular section conductors) to the flux, irrespective of the local direction thereof. No such eddy current limiting feature is inherent in the ribbon type spirally wound coil 20, however, which although presenting satisfactorily narrow ribbon edges 22 to the axial component of flux unfortunately also concomitantly presents a relatively broad surface 28 of conductive ribbon to the radial component of flux. It is vulnerability to the radial component of flux which has hitherto prevented effective utilization of the ribbon wound coil construction of FIG. 2. To overcome this vulnerability the invention provides flux-contouring means to ensure that the radial component of flux is negligible throughout the coil turns whereby substantially all flux is axial and thereby has only the suitably laminated faces 27 (formed by conductor edge surfaces 22) presented to it. FIG. 3 shows schematically the manner in which the flux-contouring reactor construction of the invention achieves the desired elimination of the radial component of flux by bringing substantially all of the flux linking the spiral coil into parallel alignment with the coil axis 24. This is done (FIG. 3) by means of a pair of flux-aligning magnetic members 30 and 31 disposed adjacent the ribbon edges 22 forming the faces 27 of the coil as shown. Members 30 and 31 are arranged to obscure substantially the whole area of faces 27 and the flux thus passes unidirectionally from edge-to-edge of the turns of spiral coil 20, parallel to the broad surfaces 28 of the conductive ribbon. The flux permeating the coil turns is thus nowhere perpendicular to the relatively broad ribbon surfaces 28 and is thereby incapable of inducing any appreciable eddy currents therein. To provide a return path for the flux exteriorly of the coil 20, a pair of flux-guiding members 32 and 33 are provided. Member 32 bridges ends 34 and 35 of members 30 and 31, and member 33 bridges the remaining pair of contiguous ends 36 and 37 of members 30 and 31 in an identical manner to produce the modified flux field 38 shown in FIG. 3. Hence members 32 and 33 guide or shunt the flux between aligning members 30 and 31 exteriorly of the coil, the flux being maintained parallel to the broad ribbon surfaces 28 and thus being denied any opportunity to produce fringing or other eddy current inducing phenomena at the respective ends 34, 36, and 35, 37 of members 30 and 31. Members 30 to 33 form the flux-contouring magnetic circuit of the coil, in effect shunting the radial component of flux away from the coil interior and performing the subsidiary function of providing an encasing shell which substantially prevents eddy-currents and also shields extraneous equipment against electro-magnetic interference from the coil and vice versa. The joints 39 and 40 between the pair of flux-aligning members 30 and 31 and the associated flux-guiding members 32 and 33 respectively, constitute air-gaps in the magnetic circuit and may be used to vary the inductance of the coil.

Figure 4:
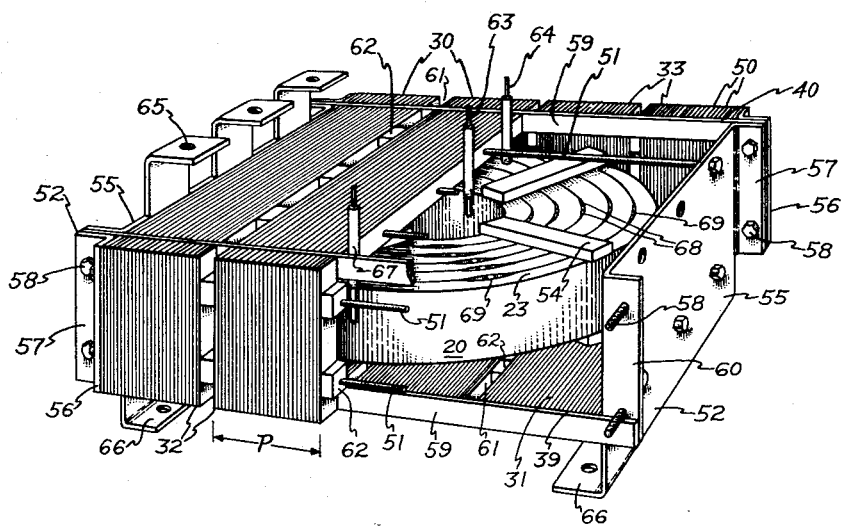
FIG. 4 is a partially cut-away perspective view of a reactor embodying the invention and shows in greater detail the mechanical construction.

The reactor structure of the invention is illustrated in detail in the perspective drawing of FIG. 4, members 30 and 31 being shown in only partially assembled condition in order to afford a clearer view of the ribbon wound spiral layer coil 20. The flux-contouring members 30 to 33 inclusive which define the magnetic circuit may be composed of "rafts" or panels of laminations 50 in the customary manner and should be disposed relatively close to the coil 20 as explained previously. Such laminations 50 may be readily inserted onto tie-rods, bolts, or similar means 51 arranged to cooperate with clamping plates 52 and thus retain the assembled members 30 to 33 in the desired inter-relationships of FIG. 3. Bracing blocks 54 of insulative material may be used to wedge coil 20 firmly between its associated flux-aligning members 30 and 31 and so prevent any tendency to relative movement therebetween due to the electromagnetic forces or vibration present when the reactor is in operation. Blocks 54 should not be thicker than necessary for insulative and/or ventilation purposes, otherwise the distance between coil 20 and members 30 and 31 may become too great and permit the flux leaving edges 22 of ribbon-turns 21 to fringe, i.e. proceed directly to adjacent edges 22 rather than to members 30 and 31, thereby introducing a radial component and associated eddy currents. Similar considerations limit the distance from members 32 and 33 to the outer periphery of coil 20. Likewise members 30 and 31 should cover, or obscure, substantially the whole area of both faces 27 of coil 20. To permit adjustment of the air gaps existing at joints 39 and 40 in the magnetic circuit, clamping plates 52 may be divided into a set of members 55 cooperating with flux-aligning members 30 and 31 and a set of members 56 which cooperate with the flux-guiding members 32 and 33. Clamping members 55, 56 may be provided with cooperating flanges 57 which can be mechanically coupled together by means such as the clamps or bolts 58 shown. Non-magnetic shims 59 may then be readily inserted between the mating faces 60 of flanges 57 to extend along the faces of the ends of member 30 and/or the ends of member 31 to provide any desired air-gap at selected joints 39—40 of the magnetic circuit and vary the reactance accordingly. It should be noted from FIG. 3, however, that air gaps 39 in the left-hand branch of the magnetic circuit must at all times be magnetically equal to the air gaps 40 in the right-hand branch of the magnetic circuit. This equal-reluctance relationship must be maintained irrespective of the overall air gap, otherwise one branch of the magnetic circuit such as that containing member 33 may approach magnetic saturation, although the other branch containing, say member 33, may be carrying comparatively little flux. Where little or no adjustment in reactance is contemplated, the laminations comprising members 31, 32, and 33 may if desired be formed as single, integral, U-shaped laminations such that only a single air gap exists in each branch of the magnetic circuit, i.e., the single pair of gaps between the respective ends of members 30 and the U-shaped laminations comprising the combination of members 31, 32 and 33.

Ventilation ducts 61 may be provided in members 30 to 33 by incorporating spacer blocks 62 between some of the laminations. Blocks 62 are preferably inserted on tie-rods 51 and are thus prevented from falling out of ducts 61 due to vibration when the reactor is in operation. Although ducts 61 are shown as formed at equal intervals "$p$" for ease of assembly during manufacture, there is no basic technical reason for employing such uniform distribution. Ducts 61 may be of various widths and/or distributed non-uniformly in any manner dictated by thermal considerations, such as heat run data. Alternatively, since flux density is known to be greatest in the region of the central axis of a coil and tapers off in value toward the coil periphery, it may be preferable to space the ducts 61 closer together as the clamping plates 52 are approached, thereby saving magnetic material. If desired, the ducts 61 may be apportioned in accordance with both thermal and flux density considerations. Leads 63 may be brazed or otherwise attached to coil 20 and brought out through ducts 61 for connection to incoming lines (not shown). If desired, tap leads 64 may also be provided.

Extensions 65 may be provided on clamping plates 52 to act as seats for insulators (not shown) which support the incoming lines for connection to leads 63—64. Further extensions 66 may extend from plates 52 in any desired manner to form supporting feet for the reactor. Where high voltage ratings are intended, feet 66 may be mounted on insulators and coil 20 electrically connected to the magnetic members 30 to 33 inclusive which define the encasing shell. Otherwise, the insulative bracing blocks 54 normally provide adequate insulation or clearance between the coil and shell, in which case insulative sleeves 67 may be provided on leads 63—64 where they pass through ducts 61.

Laminations 50 may be of any suitable magnetic material such as the oriented grain sheet steel commonly employed in transformer construction. Alternatively, members 30 to 33 may comprise ferromagnetic particles embedded in plastic resin or other moldable material. In some applications, the central bore 25 of coil 20 may be filled by a core of magnetic material to act as a further flux-guiding member similar to members 32—33. Such an auxiliary flux-guiding member is generally found to be unnecessary however, and only tends to complicate the mechanical assembly of the reactor. It is preferable that rods 51 perform their intended clamping function without any subsidiary tendency to form, in conjunction with either laminations 50 or plates 52, shorted turns linking all or even a portion of the flux present in their vicinity. Such turns would, of course, tend to heat up due to circulating current induced therein by any such flow. Tie rods 51 should thus be insulated from laminations 50 and preferably from plates 52 and the requisite insulation can most conveniently be achieved by providing insulative sleeves extending along the length of rods 51. Hence although rods 51 and plates 52 do not necessarily need to be of non-magnetic material, it is desirable that rods 51, if of electrically conductive material, be provided with such insulative sleeves (not shown) to prevent stray currents from circulating from one to another of laminations 50 or plates 52 along rods 51. Coil 20 may be of copper sheet, aluminum foil, or similar electrically conductive material and may be wound on a tubular hub of insulative material (not shown). A typical coil used in one such reactor had an internal diameter of approximately eight inches and an external diameter of approximately two feet and consisted of a copper ribbon having a surface 28 three inches broad and an edge 8 about ten mils thick. The surface 28 may, however, be appreciably greater than three inches in breadth.

Insulation is of course provided between adjacent laminations 50 and also between adjacent turns of coil 20 and may for example take the form of either an oxide coating or a thin layer of dielectric-impregnated paper. Ventilation ducts 68 may be provided in coil 20 by inserting small insulative spacers 69 either between successive turns 13 or else between groups 23 of turns as shown in FIG. 4. Such spacers 69 may be attached conveniently to the dielectric layer prior to winding same between turns 13 for insulative purposes. Although illustrated as of circular configuration, the ribbon-wound coil 20 may be of any desired configuration, such as square or hexagonal, if a more compact layout is desired.

It will be obvious that the encasing shield formed by magnetic members 30 to 33 acts as a very effective screen against electromagnetic emanations from or to the coil. The reactor is thus inherently self-shielding and may be employed in conjunction with radar and like apparatus without giving rise to interference phenomena in the associated electronic equipment. By thus using a basic part of the reactor, namely the magnetic circuit, as a shield against eddy current and interference phenomena, the need for a separate shielding means is dispensed with and a saving in weight, cost and complexity results. Three such shell reactors may be stacked together in any of the tandem, juxtaposed, etc., relationships, previously discussed and may be electrically interconnected to form a three-phase reactor. The self-shielding features of each individual reactor will then ensure that there is negligible interphase coupling between said three reactors, usually designed on three-phase operation.

It will now be apparent that this invention provides a very versatile reactor construction having a wide range of application in electrical power systems and their associated control circuits. Furthermore, there are at most only two different sizes of laminations required which, together with the clamping plates and coil, are extremely simple to manufacture and assemble. All other components are essentially standard items and the structure may be readily knocked down for repair of damaged windings, etc. The reactance of the structure can be readily adjusted over a substantial range after installation and the magnetic shell provides an effective electromagnetic shielding for the coil and associated equipment against both eddy current and interference effects and also protects the coil against mechanical damage.

While the invention has been illustrated and described with reference to a particular physical arrangement, it will be appreciated that equivalent constructions will suggest themselves to those skilled in such matters. It is therefore the intention to cover in the appended claims all such equivalencies and modifications as do not depart from the spirit and scope of the invention as outlined herein.

What we claim as new and desires to secure by Letters Patent of the United States is:

An electrical reactor of the type used for protection and control of electrical power systems and apparatus, said reactor having a self-shielding phase structure comprising an electrically conductive ribbon of essentially rectangular cross-section whereby said ribbon has a pair of narrow edges and a pair of relatively broad substantially parallel surfaces, said ribbon being spiralled flatwise about a central hub to form a series of radially progressing substantially coplanar turns of an inductive coil, said coil having a pair of opposing faces, a flux-aligning member comprising a raft of laminations of magnetic material extending adjacent one face of said coil parallel to said narrow edges of coiled ribbon and substantially obscuring all of said one face of said coil, a similar raft of flux-aligning laminations similarly extending adjacent the remaining face of said coil parallel to the opposing narrow edges of said coiled ribbon and substantially obscuring all of said remaining face of said coil whereby the flux is directed between said rafts of laminations axially of the coil with substantial elimination of the radial component of flux permeating the coil, a raft of flux-guiding magnetic laminations extending substantially parallel to the coil axis to bridge one pair of ends of each of said flux-aligning members, a similar raft of flux-guiding laminations bridging the respective remaining ends of said flux-aligning members, a first set of bolt and clamping plate means for maintaining said flux-aligning laminations in their desired assembled locations with respect to said coil, a second set of bolt and clamping plate means for similarly clamping said flux-guiding laminations together, non-magnetic shim means for altering the mutual spacing between said flux-guiding and said flux-aligning laminations to control the reluctance thereof, bolt means for variably locating said first and second sets of clamping plates with respect to one another to accommodate said shims, said pairs of flux-aligning and flux-guiding members when so assembled forming an electromagnetic shield for said coil and ensuring that any flux linking said coil is everywhere parallel to said broad surfaces of said ribbon throughout the coil cross-section, and the magnetic material comprising said flux-aligning members being non-uniformly distributed over the face of the ribbon wound coil such that a greater proportion of magnetic material occurs adjacent the coil central diameter than at any chord parallel thereto.

References Cited in the file of this patent

UNITED STATES PATENTS

| | | |
|---|---|---|
| 461,135 | Stanley | Oct. 13, 1891 |
| 1,783,050 | Morrill | Nov. 25, 1930 |
| 2,340,081 | Sauer | Jan. 25, 1944 |
| 2,560,926 | Brownell | July 17, 1951 |
| 2,686,904 | Feder | Aug. 17, 1954 |
| 2,696,593 | Dole | Dec. 7, 1954 |
| 2,728,054 | Albers-Schoenberg | Dec. 20, 1955 |
| 2,762,019 | Short et al. | Sept. 4, 1956 |
| 2,863,130 | Gray | Dec. 2, 1958 |

FOREIGN PATENTS

| | | |
|---|---|---|
| 673,267 | Great Britain | June 4, 1952 |